United States Patent
Holz et al.

(10) Patent No.: US 10,992,048 B2
(45) Date of Patent: *Apr. 27, 2021

(54) DEVICE AND METHOD FOR COMBINED SIGNAL TRANSMISSION OR FOR COMBINED SIGNAL TRANSMISSION AND ENERGY TRANSMISSION

(71) Applicant: MOLEX CVS DABENDORF GMBH, Zossen (DE)

(72) Inventors: Rainer Holz, Berlin (DE); Frank Scholz, Berlin (DE); Ahmed Al-Mughalles, Berlin (DE)

(73) Assignee: MOLEX CVS DABENDORF GMBH, Zossen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/229,760

(22) Filed: Dec. 21, 2018

(65) Prior Publication Data

US 2019/0173187 A1 Jun. 6, 2019

Related U.S. Application Data

(62) Division of application No. 14/913,743, filed as application No. PCT/EP2014/067910 on Aug. 22, 2014, now Pat. No. 10,205,243.

(30) Foreign Application Priority Data

Aug. 23, 2013 (DE) ..................... 10 2013 216 753.9

(51) Int. Cl.
*H01Q 9/40* (2006.01)
*H02J 50/12* (2016.01)
(Continued)

(52) U.S. Cl.
CPC ............. *H01Q 9/40* (2013.01); *H01Q 1/3291* (2013.01); *H01Q 1/48* (2013.01); *H01Q 1/52* (2013.01);
(Continued)

(58) Field of Classification Search
CPC ........ H01Q 9/40; H01Q 1/3291; H01Q 21/28; H01Q 1/52; H01Q 1/48; H02J 50/12;
(Continued)

(56) References Cited

U.S. PATENT DOCUMENTS 5,568,162 A 10/1996 Samsel et al.
7,079,084 B2 7/2006 Notohara et al.
(Continued)

FOREIGN PATENT DOCUMENTS

CN 102592166 A 7/2012
CN 102647029 A 8/2012
(Continued)

OTHER PUBLICATIONS

Non-Final rejection received for U.S. Appl. No. 16/229,748, dated May 14, 2020, 17 pages.
(Continued)

*Primary Examiner* — Steven S Kelley

(57) ABSTRACT

A method and a device for combined signal transmission or for combined signal transmission and energy transfer, in particular a portable electronic terminal. The device has at least one coil structure for producing a first electromagnetic field for energy transfer or for signal transmission, wherein the device also has at least one antenna structure for additional signal transmission. The antenna structure has a first partial structure and a second partial structure. The first partial structure is designed and/or is arranged in relation to the second partial structure in such a way that signals in a first frequency range can be received and transmitted by the
(Continued)

antenna structure. At least the first partial structure is arranged adjacent to the at least one coil structure in a projection plane oriented perpendicular to a central axis of the coil structure.

18 Claims, 8 Drawing Sheets

(51) Int. Cl.
*H02J 7/02* (2016.01)
*H02J 50/70* (2016.01)
*H02J 50/90* (2016.01)
*H01Q 1/48* (2006.01)
*H01Q 1/52* (2006.01)
*H01Q 21/28* (2006.01)
*H04B 5/00* (2006.01)
*H01Q 1/32* (2006.01)
*H02J 7/00* (2006.01)

(52) U.S. Cl.
CPC .......... *H01Q 21/28* (2013.01); *H02J 7/0042* (2013.01); *H02J 7/025* (2013.01); *H02J 50/12* (2016.02); *H02J 50/70* (2016.02); *H02J 50/90* (2016.02); *H04B 5/0031* (2013.01); *H04B 5/0037* (2013.01); *H04B 5/00* (2013.01); *H04B 5/0075* (2013.01)

(58) Field of Classification Search
CPC ...... H02J 17/00; H02J 7/0042; H04B 5/0031; H04B 5/0037; H04B 5/0075
See application file for complete search history.

(56) References Cited

U.S. PATENT DOCUMENTS

| | | | |
|---|---|---|---|
| 7,592,964 B2 | 9/2009 | Muellenborn et al. | |
| 8,598,747 B2 | 12/2013 | Bilbrey et al. | |
| 8,947,180 B2 | 2/2015 | Kawamura | |
| 9,037,201 B2 | 5/2015 | Holz et al. | |
| 9,112,263 B2 | 8/2015 | Pagani et al. | |
| 9,192,080 B2 | 11/2015 | Scholz et al. | |
| 10,205,243 B2* | 2/2019 | Holz | H04B 5/0037 |
| 2005/0007067 A1 | 1/2005 | Baarman et al. | |
| 2009/0108974 A1* | 4/2009 | Raggam | G06K 19/07749 336/105 |
| 2010/0029332 A1 | 2/2010 | Fox | |
| 2011/0278947 A1 | 11/2011 | Hennig et al. | |
| 2013/0029595 A1 | 1/2013 | Widmer et al. | |
| 2013/0148634 A1 | 6/2013 | Khayrallah et al. | |
| 2013/0252661 A1* | 9/2013 | Holz | H01Q 1/007 455/552.1 |
| 2014/0143933 A1* | 5/2014 | Low | H02J 7/025 2/170 |
| 2014/0203995 A1* | 7/2014 | Romney | H01Q 19/17 343/893 |
| 2014/0354226 A1 | 12/2014 | Draaijer et al. | |
| 2015/0012061 A1 | 1/2015 | Chen | |
| 2015/0015087 A1* | 1/2015 | Endo | H02J 50/12 307/104 |
| 2015/0028107 A1* | 1/2015 | Fischer | H04B 5/0081 235/488 |

FOREIGN PATENT DOCUMENTS

| | | |
|---|---|---|
| CN | 103125082 A | 5/2013 |
| DE | 112004002040 T5 | 9/2006 |
| DE | 102010019904 A1 | 11/2011 |
| DE | 102010028992 A1 | 11/2011 |
| DE | 102010026698 A1 | 1/2012 |
| DE | 102010027620 A1 | 1/2012 |
| EP | 2362328 A1 | 8/2011 |
| EP | 2648309 A2 | 10/2013 |
| JP | H09212606 A | 8/1997 |
| WO | 2012071268 A2 | 5/2012 |
| WO | 2013105005 A1 | 7/2013 |

OTHER PUBLICATIONS

Notice of Allowance received for U.S. Appl. No. 16/229,748, dated Nov. 12, 2020, 9 pages.

* cited by examiner

DEVICE AND METHOD FOR COMBINED SIGNAL TRANSMISSION OR FOR COMBINED SIGNAL TRANSMISSION AND ENERGY TRANSMISSION

CROSS-REFERENCE TO RELATED APPLICATION

This application is a divisional of patent application Ser. No. 14/913,743, filed Feb. 23, 2016; which was a § 371 national stage filing of international application No. PCT/EP2014/067910, filed Aug. 22, 2014, which designated the United States; this application also claims the priority, under 35 U.S.C. § 119, of German patent application No. DE 10 2013 216 753.9, filed Aug. 23, 2013; the prior applications are herewith incorporated by reference in their entirety.

BACKGROUND OF THE INVENTION

Field of the Invention

The invention relates to a device and a method for combined signal transmission or for combined signal transmission and energy transmission, in particular to a portable electronic terminal device.

Terminal devices, in particular portable electrical or electronic terminal devices, for example mobile telephones, PDAs (Personal Digital Assistant), audio recording devices and video recording devices, cameras, loud speakers that can be worn on the head, and microphone units (so-called handsets), torches, toothbrushes and coffee cups with an integrated heating facility, to mention only a few, comprise an energy storage device so as to supply the electrical device with electrical energy. Otherwise the terminal device could not be operated from outside or could only be operated from outside in the presence of a permanent supply of electrical energy. In order to charge the energy storage device or to operate the terminal device, a cable connection is traditionally provided to the electrical terminal device.

However, methods for the cordless or wireless transmission of electrical energy to the terminal device are also known. Thus, for example, electrical energy can be supplied to the terminal device in an inductive manner, as a consequence of which it is possible to charge the energy storage device and/or to operate the terminal device. In so doing, an electromagnetic alternating field is generated by a primary-side conductor structure, in particular a primary-side coil arrangement, said electromagnetic alternating field being received by a secondary terminal device-side conductor structure, wherein the secondary conductor structure generates a secondary-side alternating current.

A cordless or wireless communication between a terminal device and other devices, for example by way of a radio connection, is also known.

There is also a requirement in motor vehicles to be able to charge in an inductive manner terminal devices, in particular portable terminal devices, and to be able to communicate simultaneously in a wireless manner with the terminal device, for example with a communication system of the vehicle.

In so doing, it is desirable that the quality of a wireless data communication to the terminal device is influenced as little as possible by means of a transmission of energy that is occurring simultaneously in a wireless manner.

US 2005/0007067 A1 discloses a device for supplying power to a battery in a portable device, wherein the device comprises a primary part for supplying the battery with power and means for receiving power, wherein the means for receiving power are coupled to the battery. The means for receiving power are capable of receiving power from the primary part irrespective of the manner in which the means for receiving power are oriented. The publication also describes a holder for portable devices. This holder is embodied as a pocket, wherein portable terminal devices can be retained by means of adhesive bands or clips.

It is technically difficult to provide a method and a device for combined signal transmission or for combined signal transmission and energy transmission, which renders it possible to simultaneously transmit multiple signals or to simultaneously transmit signals and energy to a portable electronic terminal device, and in so doing the quality of the signal transmission and/or energy transmission is influenced as little as possible and the installation space for the proposed device is minimized.

SUMMARY OF THE INVENTION

The technical difficulty is overcome by virtue of the subjects having the features as claimed. Further advantageous embodiments of the invention are evident in the dependent claims.

A device is proposed for combined signal transmission. Different signals are transmitted in particular in a wireless manner simultaneously or concurrently between a transmitter and a receiver. The receiver can in this case be for example an electronic terminal device, for example a portable electronic terminal device, such as for example a mobile telephone.

The different signals can be transmitted concurrently by way of different channels that are in particular independent from one another. By way of example, the transmitter can be a transmitter device that is arranged in or on a vehicle. For example, signals can be transmitted and received simultaneously using different frequencies.

Alternatively, the invention relates to a device for combined signal transmission and energy transmission, in particular for the transmission of energy in a wireless manner. Signals and energy are transmitted in a wireless manner simultaneously or concurrently. The energy is preferably transmitted in an inductive manner, for example so as to inductively charge an energy storage device of the receiver, in particular of the portable electronic terminal device. Signals for the signal transmission and signals for the energy transmission, as explained above, can be transmitted simultaneously but by way of different channels, for example using different frequencies.

The device comprises at least one winding structure for generating a first electromagnetic field, in particular an alternating field, so as to transmit energy or to transmit signals. The winding structure can be embodied by way of example as a coil structure that comprises or embodies at least one coil. The coil can be for example a concentric coil, wherein windings are arranged about a central axis. The coil can also comprise a predetermined number of windings. The electromagnetic field can be generated by virtue of applying an alternating voltage to the winding structure. An alternating current flows through the winding structure and generates the first electromagnetic field. The first electromagnetic field and also the voltage/current that is generating the first electromagnetic field can comprise a first predetermined frequency.

The device also comprises at least one antenna structure for a further signal transmission. The antenna structure comprises a first part structure and a second part structure, wherein the antenna structure is embodied in such a manner that signals can be received and transmitted in a predetermined frequency range by means of the antenna structure. The predetermined frequency range can include by way of example frequencies of 700 MHz (inclusive) up to 2,600 MHz (inclusive). The frequency of the first electromagnetic field and consequently also the frequency of the alternating current/alternating voltage that is generating the first electromagnetic field lies outside this predetermined frequency range. If the first electromagnetic field is used so as to transmit energy, the frequency of the first electromagnetic field can thus lie in a frequency range of 100 kHz up to 10 MHz, also by way of example in a frequency range of 105 kHz up to 205 kHz.

As an alternative or in addition thereto, the first part structure can be arranged in such a manner opposite the second part structure that signals can be received and transmitted in the predetermined frequency range by means of the antenna structure. In this case, the previously explained transmission characteristics and the reception characteristics of the antenna structure are also determined by virtue of embodying the first part structure and the second part structure and/or the arrangement of the first part structure relative to the second part structure.

The first part structure can be connected to a first signal potential, by way of example by way of a corresponding contacting device, in particular by way of a high frequency plug connector or a first contact of the high frequency plug connector. The further part structure can be connected to a further signal potential, by way of example by way of a corresponding contacting device, in particular a high frequency plug connector or by way of a further contact of the high frequency plug connector. The first signal potential or the further signal potential can be an in particular constant reference potential, wherein the remaining signal potential is a potential that changes with respect to time. The reference potential can be a ground potential or a basis potential. The (high frequency) signal can be generated or provided by way of difference between the potentials.

It is thus feasible that the first part structure can be connected in an electrical manner or is to be connected in an electrical manner in particular by way of a first signal connection terminal to a cable core, and the second part structure can be connected in an electrical manner or is to be connected in an electrical manner in particular by way of a further signal connection terminal to a cable shield of a coaxial cable. Alternatively, the first part structure can be connected in an electrical manner or is to be connected in an electrical manner to the cable shield and the second part structure can be connected in an electrical manner or is to be connected in an electrical manner to the cable core of the coaxial cable. The cable core can denote an inner conductor of the coaxial cable. The signal connection terminals can be part of a contacting device, wherein the contacting device can be in turn part of the proposed device. The signal that is to be transmitted can be supplied by way of the coaxial cable or the signal that is to be received can be captured by way of the coaxial cable.

The first part structure can be connected to the second part structure in a galvanic or signal-conducting manner in particular in a manner so as to conduct high frequency signals. Alternatively, however, the first part structure can be connected to the second part structure in a non-galvanic manner or in a manner whereby a signal is not conducted. This can mean that the first part section and the second part structure are embodied and/or arranged in such a manner that they are galvanically separate from one another or are separate from one another as far as the signal conducting is concerned.

The first part structure can be an emitting part of a transmitting antenna or a receiving part of a receiving antenna. The second part structure can form in particular at least one part of a ground surface of the antenna structure, wherein the ground surface is allocated to the first part structure. The ground surface can however also be embodied by means of a structure that is different from the second part structure.

As is further explained hereinunder, the first part structure and the ground surface that is allocated to the first part structure can be arranged in a plane or in planes that are parallel with one another. The first part structure and the ground surface can also be embodied and arranged in such a manner that in a common projection plane, by way of example the previously explained projection plane, a changing gap is provided between mutually facing edge sections of the first part structure and the ground surface. The first part structure can thus taper towards the ground surface and/or the ground surface can taper towards the first part structure.

In terms of the invention, "can be received" and "can be transmitted" can mean that the antenna structure is embodied in such a manner that, for frequencies in the previously explained predetermined frequency range, it has in particular at its base point a return loss that is greater than a predetermined value, by way of example greater than 10 dB. Ideally, the return loss is infinitely large so that the entire power supplied to the antenna structure is emitted by the antenna structure in the predetermined frequency range. The return loss can be determined by way of example by means of a network analyzer. The return loss can be defined as the ratio between the coupled-in power in and the reflected power.

The characteristics "can be transmitted" and "can be received" can also mean that a coupling factor or a coupling loss of a signal-conducting coupling between the antenna structure and a further antenna structure of the electronic terminal device for signals from the predetermined frequency range is less than a predetermined value, by way of example less than −8 dB. Ideally, it is to be ensured that the coupling between the antenna structure and the further antenna structure does not experience any loss as far as signal conducting is concerned.

The coupling factor can vary in size in dependence upon the frequency and band. It is preferred that the coupling factor in multiple predetermined frequency ranges, by way of example in frequency ranges of multiple or all mobile radio bands GSM 850, GSM 900, GSM 1800, GSM1900, LTE700, LTE800 and further mobile radio bands, is less than the predetermined value, by way of example −8 dB.

The coupling factor for the transmitting device and receiving device of the antenna structure should be as equal as possible or at the most should have a predetermined (small) difference.

The coupling factor can be further dependent upon the further antenna structure of the electronic terminal device. The antenna structure of the proposed device is therefore preferably to be embodied in such a manner that the previously mentioned coupling factor criterion is fulfilled for a high as possible number of further antenna structures.

The coupling factor can also be dependent upon a position and orientation of the further antenna structure of the electronic terminal device with respect to the antenna structure. The antenna structure is therefore preferably to be embodied in such a manner that the previously explained coupling factor criterion is fulfilled for a high as possible number of relative positions and orientations.

The antenna structure is therefore preferably to be embodied in such a manner that the same coupling factor is provided and/or the previously explained coupling factor criterion is fulfilled for a multiple of further antenna structures and/or relative positions and/or relative arrangements.

In particular, the antenna structure can be embodied in such a manner that the previously explained coupling factor is provided between a further antenna structure of an electronic terminal device that is placed on the placement surface that is to be explained hereinunder, and the antenna structure. The terminal device can be placed on the placement surface in a multiple of relative positions and/or relative orientations.

The winding structure for generating a first electromagnetic field so as to transmit energy can be embodied by way of example as a so-called charging coil. The winding structure for generating a first electromagnetic field so as to transmit signals can be embodied by way of example as a NFC (Near Field Communication) coil. In this case, the frequency of the first electromagnetic field can be 13.56 MHz.

In accordance with the invention, at least the first part structure is arranged in a projection surface or plane, which is oriented perpendicular to a central axis of the winding structure, adjacent to the at least one winding structure. The central axis of the winding structure can be by way of example a symmetrical axis of the winding structure, by way of example a central symmetrical axis. This central axis extends parallel with a normal vector of the projection plane. The central axis can also extend parallel with a main direction of spread of the first electromagnetic field. In terms of the invention, "adjacent" means that the first part structure, in particular at least a part of an edge of the first part structure in the projection surface, is directly adjacent to the winding structure, in particular at least adjacent to a part of an edge of the winding structure, or is spaced apart from the winding structure, in particular at least from a part of an edge of the winding structure. If the winding structure comprises for example a sleeve, in particular a sleeve that has minimum geometric dimensions, the first part structure can thus be arranged in the projection plane outside this sleeve.

The winding structure and the antenna structure, in particular the first part structure, can be arranged along the central axis of the winding structure in two planes that extend parallel with one another. These planes can be embodied by way of example by means of circuit boards that are embodied as different components. The winding structure and the antenna structure, in particular the first part structure, can be arranged on these circuit boards.

The proposed device can also include or comprise a placement surface for the portable electronic terminal device. By way of example, the device can comprise a housing that forms the placement surface or on which the placement surface is arranged. The winding structure and the antenna structure can be arranged within the housing, by way of example in an inner volume of the housing. The antenna structure, in particular the first part structure, can be arranged along the central axis of the winding structure between the winding structure and the placement surface. The placement surface can be oriented at least in part likewise perpendicular to the central axis of the winding structure. The winding structure, the antenna structure and the placement surface can consequently be arranged in three planes that are different from one another yet parallel with one another.

Also the first and the second part structure of the antenna structure can be arranged in one plane or in two different, parallel planes that are arranged along the central axis spaced apart from one another. By way of example, the first part structure can be arranged on a first surface of a circuit board, for example an upper face, and the second part structure can be arranged on a surface of the circuit board, for example a lower face, that lies opposite the first upper surface. In particular, the first part structure can be arranged on an upper surface of the circuit board that is facing an electronic terminal device that is arranged on the placement surface, wherein the second part structure can be arranged on an upper surface of the circuit board that is remote from the electronic terminal device that is arranged on the placement surface. Also, the first part structure can be arranged on an upper surface of the circuit board that is remote from an electronic terminal device that is arranged on the placement surface, wherein the second part structure can be arranged on an upper surface of the circuit board that is facing the electronic terminal device that is arranged on the placement surface.

In addition to the first part structure, the previously explained ground surface that is allocated to the first part structure can be arranged in the projection surface or plane that is oriented perpendicular to a central axis of the winding structure, at least in part or completely adjacent to the at least one winding structure.

The proposed device renders it possible by virtue of a spatial design and the arrangement of the different structures in an advantageous manner that the signals of the simultaneous signal transmissions or the signals of the simultaneous signal transmission and energy transmission have as little influence on one another as possible, as a consequence of which in an advantageous manner a quality of the signal transmissions and/or of the energy transmission is maximized. At the same time, the spatial arrangement of the individual structures in the proposed device renders it possible to provide an embodiment that has minimum requirements as far as the installation space is concerned and can be integrated in an advantageous manner, for example in a motor vehicle, by way of example a central console of a motor vehicle.

In a further embodiment, the device also comprises a damping structure for damping the electrical field of the winding structure. The term 'electrical field of the winding structure' describes the electrical field or the electrical part of the first electromagnetic field that is generated by the winding structure. The damping structure overlaps the at least one winding structure at least in part in the previously explained projection plane. If the winding structure comprises for example a sleeve, in particular a sleeve having minimum geometric dimensions, at least one part of the damping structure can thus be arranged in the projection plane inside this sleeve. If the device, as previously described, comprises a placement surface, the damping structure or at least one part of the damping structure can thus be arranged along the central axis between the winding structure and the placement surface. One part of the placement surface can also overlap the winding structure and/or the damping structure in the projection plane.

The damping structure can be embodied by way of example at least in part as a comb structure. A comb structure comprises by way of example one or multiple central cross piece(s) and teeth that are arranged perpendicular thereto. The cross piece and the teeth can be embodied by way of example from a material that has a predetermined conductivity, for example from copper.

The damping structure is used to damp an electrical field or the electrical part of the electromagnetic field. By way of example, the damping structure can be embodied in such a manner that the electrical field, which is generated by means of the winding structure, is damped by at least 20 dB, preferably completely damped, after it passes through the damping structure.

At the same time, the damping structure can be embodied in such a manner that the extent to which the magnetic field or the magnetic part of the electromagnetic field that is generated by means of the winding structure is damped is minimal. By way of example, the damping structure can be embodied in such a manner that the magnetic field is damped at the most by 1 dB, ideally not damped at all, after it passes through the damping structure.

The damping structure is consequently used as far as possible exclusively for damping the electrical field, whilst the magnetic field is influenced as little as possible.

This renders it possible in an advantageous manner that the signal transmission, for example by way of the first part structure of the antenna structure, is influenced as little as possible by means of the electrical field of the electromagnetic field that is generated by means of the winding structure. At the same time, it is however ensured that the transmission of energy or signals by way of the magnetic field of the electromagnetic field is guaranteed or likewise is influenced as little as possible.

The damping of the electrical field not only leads to only a minimal influence on the antenna coupling but also is used in an advantageous manner for the purpose of adhering to the EMV guidelines relating to emissions. This is particularly important when the device is used in the automotive industry, in particular in the internal compartment of a motor vehicle.

The inductive energy transmission by means of the electromagnetic field is associated with a distinctive electrical alternating field that not only occurs in the case of the fundamental frequency for example in the interval between 10 kHz and 10 MHz but also (in the case of a required higher level of efficiency) in the case of harmonic waves of the fundamental frequency. Consequently, a maximum of multiples of the fundamental frequency are present in the spectrum. The proposed damping structure renders it possible in an advantageous manner that these harmonic waves are shielded, wherein the magnetic field is not damped or is only damped to a minimal extent.

By way of example, the damping structure can be embodied as a circuit board, wherein the circuit board comprises openings, for example openings that are embodied as slots or as holes, the dimension of which, by way of example its diameter or width, is smaller than a predetermined dimension that is dependent upon the wave length.

The dimensions, by way of example a diameter of the openings, can thus advantageously be very much smaller than the wave length of the signal that is to be shielded. By way of example, one dimension in particular a diameter can be smaller than or equal to $\lambda/100$, wherein $\lambda$ represents the wave length of the signal that is to be shielded.

The shielding effect is improved by means of dimensions that are below this value of $\lambda/100$. This is particularly important if it is not only the fundamental wave that is to be damped but also a content, often not further specified, of multiples of the fundamental wave is likewise to be damped. Any reduction of the dimension consequently increases the shielding effect up to a maximum value that is to be expected when using a closed metal plate to provide the shielding effect.

The damping structure can also be embodied in such a manner that a maximum diameter of a closed current path that can be formed in the damping structure in the case of self-induction is smaller than a predetermined diameter.

The term 'self-induction' describes in this case an induction that is caused in the damping structure by means of the electromagnetic field that is generated by means of the winding structure.

Since the damping structure is immediately adjacent to the winding structure, the exciting magnetic field can penetrate the damping structure on a surface that can correspond at least to the upper surface of the winding structure. The damping structure should therefore preferably be embodied and/or arranged in such a manner that the magnetic field is not damped or is only damped to a predetermined minimal extent. Any influence on the magnetic field by means of an opposing magnetic field that is generated for example as a result of eddy-currents is to be minimal. The damping structure can thus therefore preferably be embodied and/or arranged in such a manner that eddy-currents in the damping structure have a current strength that is less than a predetermined value and/or comprise a current path that is shorter than a predetermined value. This can be achieved by way of example by means of high ohmic conductor structures that in themselves are not closed, wherein a field is produced that is only very low and is opposite to the exciting magnetic field. In particular, the previously explained characteristic can be fulfilled by means of an at least in part comb-shaped damping structure, wherein the width of the individual teeth is very much smaller than a maximum spread of the exciter coil field, by way of example smaller than one hundredth of the said spread.

It is preferred that the damping structure, by way of example a sleeve of the damping structure, and the winding structure, by way of example a sleeve of the winding structure, overlap fully in the projection plane. This means that either the sleeve of the damping structure or the sleeve of the winding structure is arranged completely inside the sleeve of the respective other structure.

The first part structure and/or the second part structure of the antenna structure can be arranged adjacent to the damping structure in the projection surface or projection plane. As previously explained with regard to the first part structure and the winding structure, the first part structure and/or the second part structure can be arranged directly adjacent to the damping structure or spaced apart at a predetermined distance therefrom.

It is possible that the antenna structure and the damping structure can be embodied electrically separate from one another, in other words electrically insulated from one another.

In a preferred embodiment, the damping structure and the antenna structure are arranged on a common circuit board.

The common circuit board can be embodied and arranged along the central axis and structurally separate from a circuit board on which the winding structure is arranged. The common circuit board can also be arranged along the central axis of the winding structure between the previously explained placement surface and the winding structure. The first part structure and/or the second part structure of the antenna structure and the damping structure can be arranged at least in part, yet preferably fully, in a common plane.

The proposed embodiment renders it advantageously possible to structurally integrate the damping structure into the device in an as simple manner as possible, wherein at the same time a quality of the signal transmission and/or energy transmission is influenced as little as possible. It is to be taken into consideration that the signal transmission and/or energy transmission can be directed from the winding structure or the antenna structure to a portable terminal device that is lying on the placement surface. By virtue of arranging the damping structure on a common circuit board together with the antenna structure, the signal transmission between the antenna structure and such a terminal device is consequently influenced as little as possible since the electric field of the electromagnetic field of the winding structure is already damped in the area between the antenna structure and placement surface by means of the damping structure.

In a further embodiment, the damping structure forms the second part structure of the antenna structure at least in part. It is feasible that the damping structure completely forms the second part structure of the antenna structure. The damping structure is a component of the antenna structure and is therefore connected in an electrical manner to the first part structure.

In a preferred embodiment, at least one part of the second part structure forms a ground surface of the antenna structure. The term 'ground surface' describes in this case a so-called "ground plane". In this case, the first part structure and the second part structure together form a monopole antenna. The monopole antenna in this case can be a so-called wideband monopole that can transmit and receive the signals in the previously explained frequency range.

It is possible that the second part structure, in particular the ground surface and the first part structure, are arranged in a common plane. The second part structure and the first part structure can also be arranged in parallel planes that are spaced apart from one another by a predetermined (small) amount. In this case, the first part structure and the second part structure form a so-called planar monopole antenna, in particular a planar wideband monopole.

Alternatively, at least one part of the first part structure or the entire first part structure forms a ground surface of the antenna structure. In this case, the second part structure can also form the damping structure.

This renders it possible in an advantageous manner to structurally integrate the damping structure and the antenna structure in an as simple manner as possible, wherein at the same time the antenna structure is embodied so as to save as much installation space as possible. In this embodiment, the antenna structure therefore provides by means of one of its part structures simultaneously the function of the previously explained damping structure. This means that the antenna structure and the damping structure are integrated as far as the function is concerned. As a consequence, it is possible as previously explained to further minimize the amount of installation space required.

In a further embodiment, the first part structure is embodied in the form of a frame, wherein the first part structure completely surrounds or encompasses the second part structure. The first part structure can form in this case a complete frame. The first part structure can encompass an inner surface or an inner volume in which the second part structure is arranged. The first part structure can thus encompass in the previously explained projection plane an inner surface in which the second part structure is arranged.

It is preferred that the first part structure in this embodiment forms a ground surface of the antenna structure. In this case, the first part structure can be connected to a reference potential. However, it is also feasible that the second part structure in this embodiment forms the ground surface of the antenna structure, wherein the second part structure can be connected to a reference potential.

An intermediate space or gap is provided or arranged between an inner edge of the first part structure and an outer edge of the second part structure. A coupling field can be formed in the intermediate space or gap between the two part structures.

As a consequence, this produces in an advantageous manner that a mobile radio device that is placed on the placement surface, whose internal mobile radio antenna(e) are positioned opposite this intermediate space or along this intermediate space couple in a particularly effective manner, in other words with a particularly low level of coupling damping. It can be assumed from this that internal mobile radio antennae of mobile radio devices are generally arranged in the edge region of the mobile radio device, wherein a battery of the mobile radio device is arranged in the central region. The proposed device can in this case preferably be embodied in such a manner that when arranging the mobile radio device on the previously explained placement surface, the second part structure is arranged opposite or below the central region of the mobile radio device and the first part structure is arranged opposite or below the edge region of the mobile radio device. As a consequence, this produces in an advantageous manner a particularly effective coupling arrangement or a particularly low level of damping.

In a further embodiment, a gap between an inner edge of the first part structure and an outer edge of the second part structure varies along the inner edge of the first part structure. The gap can in this case describe for example the minimum gap from a point on the inner edge of the first part structure to a point on the outer edge of the second part structure. The gap can also be provided in the previously explained projection plane or parallel with this projection plane. The gap can include in this case a first portion that is oriented parallel with the longitudinal side of an outer edge of the first part structure; said longitudinal side is yet to be explained further hereinunder. The gap can also include a further portion that is oriented perpendicular to the the longitudinal side and consequently parallel with an end face of an outer edge of the first part structure. It is possible in this case to vary the size of the first and/or the further portion along the inner edge.

The term 'along the inner edge' can mean by way of example that points are considered that are arranged along the inner edge of the first part structure one behind the other in the mathematically positive direction, wherein the mathematically positive direction is defined with regard to the previously explained central axis of the winding structure that is oriented away from the winding structure towards the first part structure and/or second part structure.

The gap along the entire inner edge can be greater than zero. However, it is also possible that the gap is zero at individual points or sections of the inner edge. In this case, an electrical contact can be provided between the first part structure and the second part structure. This is not however compulsory, in particular if two part structures are arranged in different planes.

As a result of varying the gap, different coupling regions can be formed in an advantageous manner along the inner edge, wherein the quality of the coupling of different coupling regions is different for different frequencies or frequency regions. This means that for one point or multiple points or section or sections along the inner edge a coupling factor for a signal that has a specific frequency or from a specific frequency range can be higher than in the remaining points or sections. In one point or multiple further points or section(s) along the inner edge, a coupling factor can then be higher for a signal that has a different frequency or for a signal from a different frequency range than in the remaining points or sections.

In a further embodiment, an outer edge of the first part structure comprises a contour that is essentially or precisely rectangular, wherein the gap between an inner edge of the first part structure and an outer edge of the second part structure in one part region that extends along or is parallel with a longitudinal side of the first part structure is selected in such a manner that signals can be received and transmitted in a first part frequency range. Also, the gap between an inner edge of the first part structure and an outer edge of the second part structure in a part region that extends along or parallel with an end face of the first part structure is selected in such a manner that signals can be received and transmitted in a further part frequency range. Essentially, the term 'of a rectangular shape' also includes embodiments wherein the contour of the outer edge can comprise at least one recess, for example depressions, or at least one indentation. As a consequence, the first part structure can be adapted to suit by way of example a particular assembly concept or an available installation space. The part frequency ranges can be different from one another.

The part regions can describe regions of the inner surface, in particular edge regions of the inner surface.

In particular, the gap between an inner edge of the first part structure and an outer edge of the second part structure in a part region that extends along or parallel with a longitudinal side of the first part structure can be selected in such a manner that it is possible to receive and transmit signals in the frequency ranges of the mobile radio standards GSM850 and/or GSM900, in particular with a predetermined coupling factor. Also, the gap between an inner edge of the first part structure and an outer edge of the second part structure in a part region that extends along or parallel with an end face of the first part structure can be selected in such a manner that it is possible to receive and transmit signals in the frequency ranges of the mobile radio standards GSM1800 and/or UMTS2100, in particular with a predetermined coupling factor.

As a consequence, it is achieved in an advantageous manner that regions that provide a coupling that varies in effectiveness for different frequencies are arranged spatially separate from one another. The arrangement can be formed in this case in particular in such a manner that the arrangement of the region is adjusted to suit an arrangement of coupling elements of a mobile telephone that is arranged in a predetermined orientation with respect to the placement surface.

In a further embodiment, the first part structure comprises along the inner edge at least one protrusion and/or the second part structure comprises along the outer edge at least one protrusion. The second part structure can comprise the at least one protrusion in the part region that extends parallel with a longitudinal side of the first part structure or is facing this longitudinal side. It is preferred that the second part structure comprises the at least one protrusion in the part region that extends parallel with an end face of the first part structure or is facing this end face.

The term 'a protrusion' describes in this case a particularly protruding or prominent part region of the part structure that protrudes from a central region or main region of the part body in the direction of the respective other part structure. The part region of the protrusion of a part structure can widen or taper with respect to the respective other part structure. The respective other part structure can comprise recesses or indentations that correspond to the protrusions and into which the protrusions and sub-protrusions extend.

The inner edge of the first part structure and the outer edge of the second part structure can comprise for example in each case straight sections that are adjacent to one another at predetermined angles. The base of the second part structure can have a perimeter line in the form of a simple, convex polygon, wherein a geometric middle point of the polygon can be identical to the geometric middle point of the second part structure. By virtue of the at least one protrusion, the actual perimeter line comprises the shape of a non-convex polygon or forms a non-convex polygon. This means that by virtue of the at least one protrusion the perimeter line of the second part structure is changed from the perimeter line of a simple convex polygon into the perimeter line of a non-convex polygon.

A protrusion can in turn comprise at least a further sub-protrusion. A base perimeter line of the protrusion can comprise the shape of a simple convex polygon or form a simple convex polygon, wherein a geometric middle point of the polygon is identical to the geometric middle point of the protrusion. By virtue of the at least one sub-protrusion, the actual perimeter line of the protrusion comprises the shape of a non-convex polygon or forms a non-convex polygon. This means that by virtue of the at least one protrusion the perimeter line of the protrusion is changed from the perimeter line of a simple convex polygon into the perimeter line of a non-convex polygon.

Corresponding embodiments are also feasible for the inner surface that is adjacent to the first part structure, wherein the inner edge of the first part structure is embodied by way of example in such a manner that a base perimeter line of the inner surface comprises the shape of a simple convex polygon or forms a simple convex polygon, wherein a geometric middle point of the polygon can be identical to the geometric middle point of the inner surface. By virtue of the at least one protrusion, the actual perimeter line comprises the shape of a non-convex polygon or forms a non-convex polygon. A protrusion can also in this case comprise in turn at least one further sub-protrusion.

By way of example, the protrusion of the second part structure can be encompassed by a straight first section and end section along the corresponding inner edge or outer edge of the part structure and all straight sections that lie between the two, wherein the first section includes with the preceding straight section that extends along the edge an angle that is less than 180° in particular less than 90°, wherein the angle is measured in the mathematical positive direction starting from the preceding section. The end section can likewise include with the straight section that is downstream along the edge an angle that is less than 180°, in particular less than 90°. The angle between the first section and end section and all sections that are possibly lying between the two can be in particular greater than 180°.

By virtue of the at least one protrusion, in particular a length of the actual perimeter line of the second part structure or of the inner surface is increased in comparison to the length of the base perimeter line. As a consequence, it is also possible to extend the intermediate space or gap between the two part structures that is essential for the coupling arrangement. It is also possible by virtue of the at least one protrusion to adapt a spatial design or a spatial arrangement of the intermediate space in such a manner that it is guaranteed that it is possible to produce a desired coupling in predetermined spatial regions of the part structures.

In a further embodiment, the first part structure and the second part structure are connected in a galvanic manner or in a manner so as to conduct signals, in particular to conduct high frequency signals. In particular, the first part structure and the second part structure can be connected in the region of an end face of the first part structure in a galvanic manner or in a manner so as to conduct signals. The connection that is produced in a galvanic manner or in a manner so as to conduct signals can be provided in particular in the form of a through contacting arrangement or by way of an edge contacting arrangement, in particular if the first part structure and the second part structure are arranged on faces of the circuit board that are different from one another.

A current that is flowing in the region of the galvanic contacting arrangement is greater in comparison to a current that is flowing in further part regions of the first part structure and the second part structure, as a consequence of which it is possible in turn to increase the emitted power in this region and consequently to increase the ability of producing a coupling. If the first and the second part structure are connected in a galvanic manner, the first part structure can thus be connected to the previously explained reference potential and/or form a ground surface.

It is of course also possible that the first part structure and the second part structure are not connected in a galvanic manner or not in a manner so as to conduct signals. In this case, it is possible in particular to connect the second part structure to the previously explained reference potential and/or to form a ground surface.

In a further embodiment, the first part structure of the antenna structure is embodied in a cup-shaped manner.

This means that the first part structure has a cup-shaped cross section in a plane in which the first part structure is arranged or in the previously explained projection plane. The cup-shaped cross section tapers from a first end of the first part structure towards an end that lies opposite the first end. The end that lies opposite the first end can be in particular the end of the first part structure that is facing a ground surface of the antenna structure.

The ground surface that is facing the first part structure can be formed by way of example by means of a structure that is different to the first part structure and the second part structure. If the cross section of the first part structure tapers in the projection plane towards the ground surface, the structure that forms the ground surface can thus likewise taper towards the first part structure or can have constant dimensions.

It is however also possible that the first part structure has constant dimensions, for example the first part can have a cross section with constant dimensions in the projection plane and the structure that forms the ground surface tapers towards the first part structure.

If the second part structure forms at least a part of the ground surface, the cup-shaped cross section can thus also taper towards the second part structure.

The cup-shaped cross section can be embodied in a triangular form. The first part structure can be embodied or arranged in such a manner that a tip of the triangle is oriented towards the ground surface that is allocated to the first part structure. In this case, a base face of the triangle is arranged on a face of the first part structure that lies opposite the face of the triangle that is facing the ground surface that is allocated to the first part surface. The remaining two limbs of the triangle can extend at a predetermined angle from the base face towards the ground surface, wherein for example a tip of the triangle is adjacent to the ground surface or is arranged at a predetermined distance adjacent to the ground surface. The base face and the limbs form edge sections of the first part structure.

Alternatively, the cup-shaped cross section can be embodied in the form of a part circle, for example in the form of a semi-circle. The circular edge section of the first part structure can be facing the ground surface, as a consequence of which the first part structure tapers towards the ground surface.

As a further alternative, the cup-shaped cross section can be embodied in the form of a part ellipse or can have a form of a part ellipse. The elliptical edge section of the first part structure can be facing the ground surface, as a consequence of which the first part structure tapers towards the ground surface.

The decisive factor for receiving and transmitting signals at frequencies from the previously explained frequency range is the varying of the distance between the edge sections of the tapering part of the first part structure and an edge section of the ground surface that is allocated to the first part structure, by way of example of the ground surface that is embodied by the second part structure.

In an advantageous manner, a high quality transmission of signals is achieved by means of the first part structure as a result of the cup-shaped embodiment of the first part structure.

In a further embodiment, the damping structure is embodied at least in part in a comb-shaped manner. The teeth of the comb-shaped damping structure can be arranged by way of example in the projection plane parallel with and/or perpendicular to the previously explained straight edge section of the first part structure at a predetermined distance from this straight edge section. The damping structure can be embodied in the form of a double comb, wherein the teeth extend on both sides away from a central connecting cross piece, in particular perpendicular thereto. It is of course also feasible that the damping structure is embodied in the form of a single comb, wherein the teeth of the damping structure extend away only on one side of a central cross piece or wherein teeth are arranged between two parallel extending cross pieces that are arranged spaced apart from one another.

A further part of the damping structure can be embodied in a planar manner so as to improve the characteristics of the second part structure as a ground surface. By way of example, at least a further part of the damping structure can be embodied in a planar manner and can comprise a predetermined surface area, by way of example 300 mm$^2$.

This renders it possible in an advantageous manner to achieve a simple as possible embodiment of the damping structure, wherein at the same time an effective as possible damping of the electrical field of the electromagnetic field is achieved.

In a further embodiment, the damping structure comprises at least one capacitive element, wherein at least two part sections of the damping structure are connected in an electrical manner by means of the capacitive element. Two part sections of the damping structure that are spaced apart from one another at a predetermined distance can be connected in an electrical manner by means of the capacitive element, by way of example a capacitor. In particular, two adjacent teeth of a comb-shaped damping structure can be connected in an electrical manner by means of the capacitive element. In this case, the capacitive element can be arranged by way of example between free ends of adjacent teeth, wherein the term 'a free end of a tooth' describes an end of the tooth that is arranged opposite on a further end of the tooth that is adjacent to the previously explained connecting cross piece.

In the case of frequencies that lie above a predetermined limit frequency, by way of example 600 MHz, an impedance of the capacitive element can be less than a predetermined impedance. As a consequence, it is possible in the case of high frequencies, in particular frequencies that are higher than the previously explained limit frequency, to provide an uninterrupted as possible ground surface, wherein in the case of low frequencies the extent to which the magnetic field of the electromagnetic field is damped as a result of eddy currents owing to the interruptions in the ground surface is minimized.

In a further embodiment, the antenna structure comprises at least a further part structure, wherein the further part structure is embodied and/or arranged opposite the second part structure in such a manner that by means of the further part structure signals can be received and transmitted in a second predetermined frequency range. The second predetermined frequency range can in this case be identical to the first predetermined frequency range. However, it is preferred that it is different to the first predetermined frequency range.

The second frequency range can include by way of example frequencies between 1400 MHz (inclusive) up to 2600 MHz (inclusive). In this case, the second frequency range is different to the first frequency range. However, the frequency ranges can overlap at least in part.

The further part structure is, as is the first part structure, arranged adjacent to the at least one winding structure in a projection plane that is oriented perpendicular to a central axis of the winding structure.

The statements with regard to the first part structure also apply for the further part structure. By way of example, the further part structure can also be embodied in a cup-shaped manner.

In particular, it is possible that the first part structure and the further part structure are arranged on opposite-lying faces of the second part structure. As a consequence, a symmetrical antenna structure is produced in an advantageous manner. The two part structures can be embodied by way of example as opposite-lying cups, for example opposite-lying semi-circles, semi-ellipses or opposite-lying triangles whose tips lie opposite one another, wherein the tapering parts of the first part structure and the further part structure taper towards one another.

If the proposed device comprises a damping structure, said damping structure can thus be connected in an electrical manner both to the first part structure and also to the further part structure. However, an electrical connection is not absolutely necessary.

It is possible by virtue of providing a further part structure to further improve a coupling so as to conduct signals between the antenna structure and for example a portable terminal device, wherein despite this only a small installation space is required. It is thus possible to place a so-called double-cup structure in the close proximity of the winding structure and the components that are associated with the winding structure, such as for example a ferrite core, a cooling body or the previously explained damping structure, wherein despite this it is still possible to achieve a coupling that is sufficiently effective to conduct signals.

It is also possible that the first part structure and/or the further part structure include or comprise an additional blind conductor structure. As an alternative or in addition thereto, a ground surface that is allocated to the first part structure and/or to the further part structure can also include or comprise a blind conductor structure. The blind conductor structure can also be described as a stub cable structure or can include a stub cable structure.

The blind conductor structure can also be described as a so-called stub structure. The blind conductor structure can be embodied by way of example in the form of a strip. Also, by way of example, the blind conductor structure can be embodied from copper. It is possible that the blind conductor structure extends, in particular in the projection plane, perpendicular to an axis that connects the first part structure and the further part structure. The blind conductor structure can also be arranged on the tapering face of the respective part structure. It is also possible that the blind conductor structure is formed on the face of the part structure that is lying opposite the tapering face of the part structure. The blind conductor structure can thus be arranged on a face of the respective part structure that is remote from the ground surface. The blind conductor structure can extend parallel with the previously explained straight edge section of the corresponding part conductor structure.

The blind conductor structure can also be connected in an electrical manner to the corresponding part structure, in other words either to the first part structure or the further part structure or the ground surface. As previously explained, the blind conductor structure can extend in the projection plane perpendicular to the central axis of the winding structure. It can also be arranged in such a manner that it is arranged in the projection plane adjacent to the winding structure or adjacent to the winding structure at a predetermined distance therefrom.

The length of the blind conductor structure can be selected such that the antenna structure has an additional resonance frequency in a mid frequency range, by way of example in a frequency range of 880 MHz to 960 MHz (GSM 900 standard). The length of the blind conductor structure can of course be adapted in such a manner that the antenna structure forms additional resonance frequencies in other frequency ranges, by way of example in frequency ranges of the mobile radio band GSM 850, LTE700, LTE800. The term 'length' describes in this case a dimension along a longitudinal direction of the blind conductor structure, in particular a strip-shaped blind conductor structure.

By virtue of the additional blind conductor structure, it is consequently possible in an advantageous manner to produce a coupling that can also efficiently conduct signals in the corresponding frequency range.

If the proposed device only comprises one blind conductor structure, this can thus be arranged with regard to the central axis in the projection plane either on the face of the first part structure or on the face of the further part structure. However, it is also possible that the device comprises two blind conductor structures, wherein a first blind conductor structure is connected in an electrical manner to the first part structure and a further blind conductor structure is connected in an electrical manner to the further part structure and is arranged on the respective face. The two blind conductor structures can consequently be arranged in the projection plane both to the right and also to the left or above and below adjacent to the winding structure.

The blind conductor structures can be connected to the respective part structure or to a ground surface by means of a controllable switching element, by way of example a high frequency switch, also by way of example a so-called PIN diode. In a closed state, the respective blind conductor structure is connected in an electrical manner to the corresponding part structure or the ground surface. In an open state, the respective blind conductor structure is galvanically separate from the corresponding part structure or ground surface.

It is possible in dependence upon an orientation and/or a structure of a terminal device that is placed on the placement surface to control the switching elements in such a manner that only one of the two blind conductor structures is connected in an electrical manner to the corresponding part structure or the ground surface. It is possible by way of example by way of a NFC query to ascertain an orientation of the terminal device. It is then possible to determine a type of terminal device from the NFC query.

Alternatively, it is feasible that a length of the blind conductor structure is variable. By way of example, the blind conductor structure can comprise multiple conductor segments that can be connected in an electrical manner in each case by way of a switching element. It is consequently possible by virtue of closing the switching elements to set a desired length of the blind conductor structure. In so doing, it is possible in an advantageous manner to change or set resonance frequencies of the antenna structure. By way of example, it is possible in this manner to switch the antenna structure to receive frequencies in the range of GSM 900, which are usual in Europe, to receive in the frequency range GSM 850, which is usual in the USA. Segments can be initially switched in or switched out from outside.

However, it is also feasible that the blind conductor structure comprises multiple segments, wherein a predetermined number of segments are connected by means of electrical connecting means. As a consequence, it is possible by way of example to adapt a resonance frequency of the antenna structure at the time of production, wherein said resonance frequency can no longer be subsequently changed.

If the proposed device comprises a first and a further part structure, it is thus possible to supply a signal in an asymmetrical or symmetrical manner.

By way of example, a signal can be coupled in a symmetrical manner between the first part structure and the further part structure. It can be necessary for this purpose to balance a signal that is usually available as an asymmetrical signal and is supplied for example by way of a coaxial cable. This is possible for example using a so-called Balun device.

However, it is also possible to provide an asymmetrical coupling. In this case, an additional conductor structure can be provided that extends from one of the two part structures to the other part structure, for example from a tip of the first part structure that is facing the second part structure to the second part structure, across a small gap between the two part structures and over an entire length of the respective other part structure. It can be necessary for this purpose that the the part structures are arranged along the central axis offset at a predetermined distance with respect to one another.

By way of example, it is then possible, depending upon a material of a circuit board and upon a thickness of the circuit board, to embody the conductor structure as a so-called microstrip wire that has a predetermined impedance, by way of example 50 Ohm. In this case, it is possible for example to use the other part section, in particular the second part structure, as a ground surface for the first part structure that is connected by way of this microstrip wire. In this case, it is possible by way of example to connect in an electrical manner a cable shield of a coaxial cable, by way of which the signal that is to be transmitted is supplied, to an edge section of the other part structure, wherein a cable core of the coaxial cable is connected in an electrical manner to the previously explained conductor structure, by way of example the microstrip wire.

A method is also proposed for combined signal transmission or for combined signal transmission and energy transmission, in particular to a portable electronic terminal device. At least one winding structure generates a first electromagnetic field so as to transmit energy or signals. An antenna structure receives or transmits signals, wherein the antenna structure comprises a first part structure and a second part structure. The first part structure is embodied and or arranged opposite the second part structure in such a manner that signals can be received and transmitted in a first frequency range by means of the antenna structure.

In accordance with the invention, at least the first part structure is arranged adjacent to the at least one winding structure in a projection plane that is oriented perpendicular to a central axis of the winding structure.

The method can be implemented in this case using a device in accordance with one of the previously explained embodiments.

Electrical energy is transmitted in a wireless manner, namely by way of the electromagnetic field both in the case of the signal transmission and also in the case of energy transmission by means of the first winding structure, in particular also in the case of an NFC. In the case of the NFC, for example energy is transmitted so that a transponder device of an NFC device is supplied with energy, as a consequence of which said transponder device is able to transmit information back to the corresponding transmitter of the NFC device. In this case, the term 'transponder device' describes a passive component, by way of example comprising a NFC antenna structure and a microchip.

Other features which are considered as characteristic for the invention are set forth in the appended claims.

Although the invention is illustrated and described herein as embodied in a device and method for combined signal transmission or for combined signal transmission and energy transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
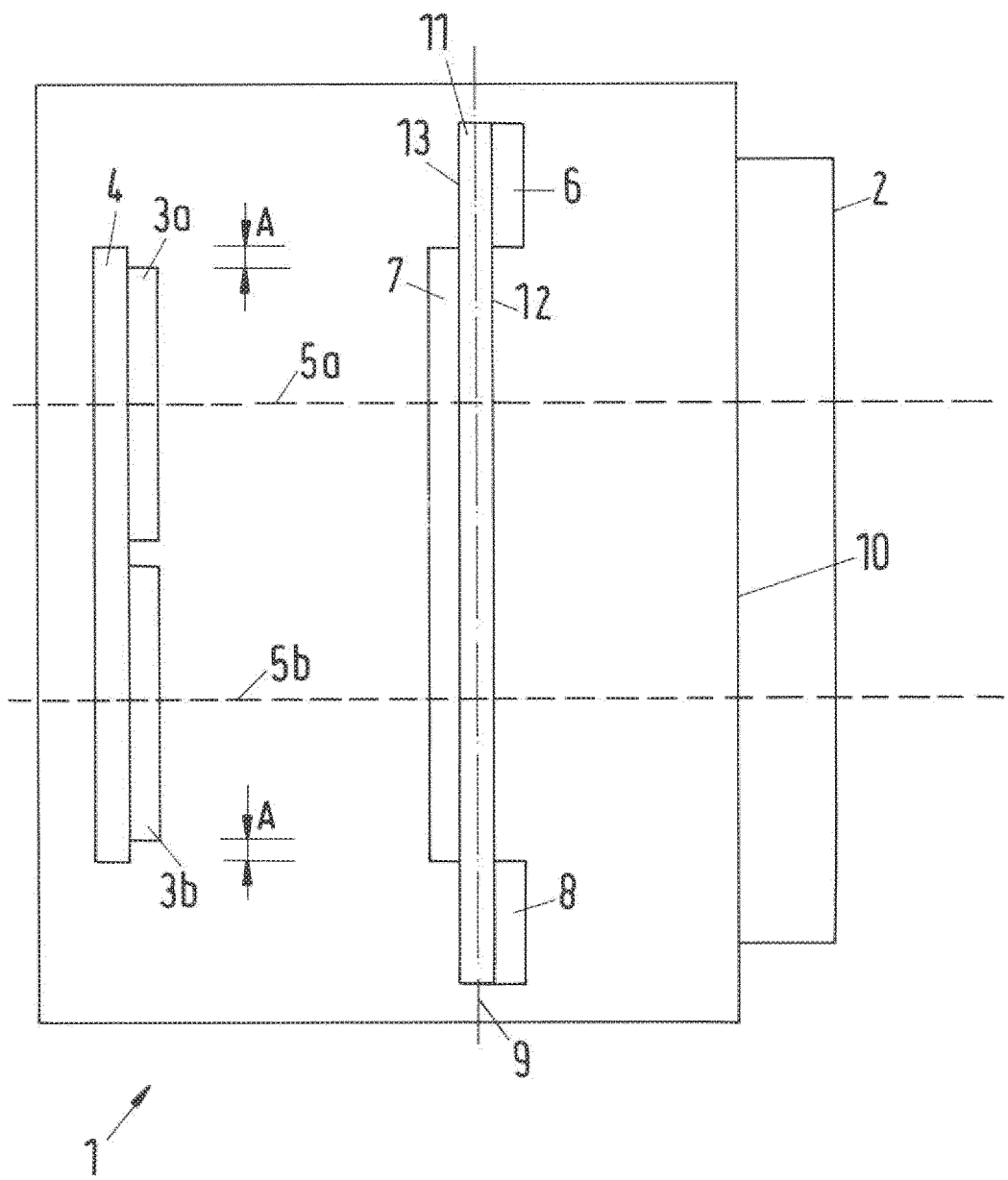
FIG. 1 a schematic lateral view of a device in accordance with the invention.

Like reference numerals describe hereinunder elements that have like or similar technical features.

FIG. 1 illustrates a device 1 for combined signal transmission and energy transmission to a portable electronic terminal device 2. The device 1 comprises a first winding structure 3a and a second winding structure 3b. A first electromagnetic field can be generated by means of the first winding structure 3a and the second winding structure 3b so as to transmit energy. The first winding structure 3a and the second winding structure 3b are arranged in this case on a first circuit board 4. The first winding structure 3a comprises a central axis 5a. The second winding structure 3b comprises a central axis 5b, wherein the central axes 5a, 5b extend parallel with one another.

The device also comprises an antenna structure, wherein the antenna structure comprises a first part structure 6, a second part structure 7 and a further part structure 8. The first part structure 6 and the further part structure 8 embodied and arranged opposite the second part structure 7 in such a manner that signals from a frequency range of 700 MHz up to 2600 MHz can be received and transmitted by means of the first part structure 6 and the further part structure 8.

A dash-dot line also illustrates a projection plane 9 that is oriented perpendicular to the central axes 5a, 5b of the winding structures 3a, 3b. The figure illustrates that the first part structure 6 is arranged in the projection plane 9 spaced apart from the first winding structure 3a at a distance A. Accordingly, the further part structure is arranged in the projection plane 9 at a predetermined distance A from the second winding structure 3b. The term 'predetermined distance A' describes in this case a minimum distance between edge sections of the part structures 6, 8 and the winding structures 3a, 3b in the projection plane 9.

The device 1 also comprises a placement surface 10 on which the portable terminal device 2 is placed. The placement surface 10 is arranged likewise perpendicular to the central axes 5a, 5b of the winding structures 3a, 3b.

The part structures 6, 7, 8 are arranged on a further circuit board 11, wherein the first part structure 6 and the further part structure 8 are arranged on a face 12 of the further circuit board 11 that lies opposite a further face 13 of the circuit board 11, wherein the further face 13 is the face of the further circuit board 11 that is facing the first circuit board 4. The second part structure 7 is arranged on the further face 13 of the further circuit board 11.

Figure 2:
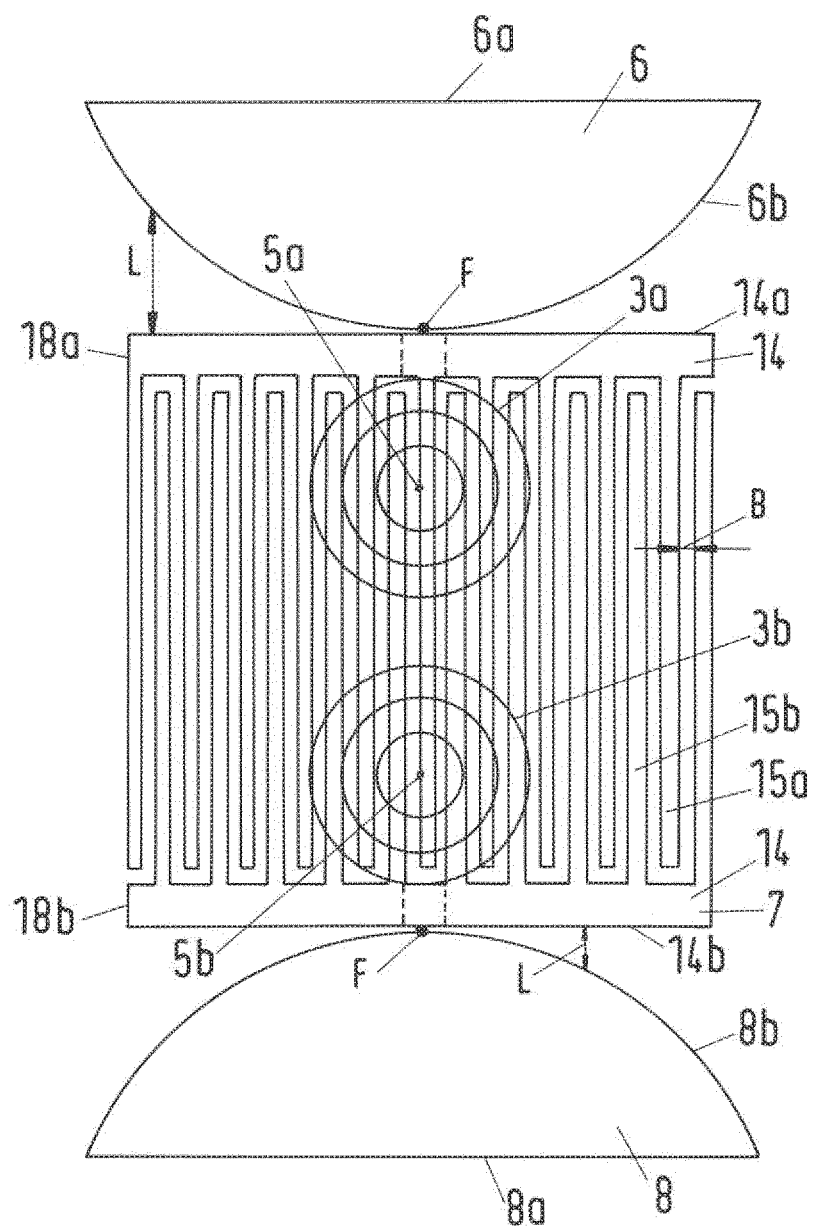
FIG. 2 a schematic plan view of the device illustrated in FIG. 1.

As is illustrated in detail in FIG. 2, the second part structure 7 is embodied as a damping grid.

FIG. 2 illustrates a schematic plan view of the device 1 illustrated in FIG. 1. The figure illustrates in particular that the first part structure 6 and the further part structure 8 are embodied in a cup-shaped manner, wherein the first part structure 6 and the further part structure 8 have a part circular cross section. One cross section plane is oriented perpendicular to the central axes 5a, 5b. The first part structure 6 and the further part structure 8 comprise in each case a straight section 6a, 8a, wherein the straight edge section 6a, 8a is arranged on a face of the respective part structure 6, 8 that is remote from the second part structure 7. Accordingly, the first part structure and the second part structure comprise a circular edge section 6b, 8b, wherein this edge section 6b, 8b, is arranged on the face of the respective part structure 6, 8 that is facing the second part structure 7. Consequently, the first part structure 6 and also the second part structure 8 taper towards the second part structure 7.

The second part structure 7 comprises a rectangular sleeve. The second part structure 7 that forms the damping grid comprises a first comb structure 18a and a second comb structure 18b. The first comb structure 18a comprises a connecting cross piece 14a and teeth 15a. The second comb structure 18b comprises a connecting cross piece 14b and teeth 15b. For the sake of simplicity, in each case only one tooth 15a, 15b is provided with a reference numeral. The first comb structure 18a and the second comb structure 18b are arranged relative to one another in such a manner that the teeth 15a, 15b mesh with one another. This means that teeth 15a extend in the intermediate spaces between the teeth 15b and conversely. It is essential that the teeth 15a of the first comb structure 18a are not in electrical contact with or connected in an electrical manner to the second comb structure. The teeth 15b of the second comb structure 18b are likewise not in contact with the first comb structure 18a.

However, it is also feasible that all the teeth 15a, 15b are arranged exclusively on one of the two connecting cross pieces 14a, 14b.

It is also feasible that the two connecting cross pieces 14a, 14b can be connected in an electrical manner by way of a further connecting cross piece [not illustrated] that extends parallel with the teeth 15a, 15b.

It is possible in dependence upon a frequency of the electromagnetic field that is generated by the winding structures 3a, 3b to select a width B of slots that are arranged between two adjacent teeth 15a, 15b of the second part structure 7.

FIG. 2 illustrates that the straight edge sections 6a, 8a extend parallel with the edge sections of the connecting cross pieces 14a, 14 of the second part structure 7. However, it is of course also feasible for the edge sections 6a, 8a to have a different contour, by way of example the edge sections 6a, 8a and/or the edge sections 14a, 14b can be curved slightly or even more intensely with a predetermined curvature.

It is evident in FIG. 2 that a distance L of the circular edge sections 6b, 8b change from the edge section of the connecting cross piece 14a, 14b that is facing these edge sections 6b, 8b along the circular edge sections 6b, 8b.

The second part structure 7 of the antenna structure consequently forms a damping grid that damps an electrical part of the electromagnetic field that is generated by the winding structures 3a, 3b, wherein the magnetic part of the electromagnetic field is not damped or is damped only to a minimal extent.

The second part structure 7 simultaneously forms a ground surface 14 of the antenna structure. The second part structure 7 and the first part structure 6 and the further part structure 8 are arranged in such a manner that the second part structure 7, in particular the connecting cross piece 14a of the first comb structure 18a together with the first part structure 6 and the second part structure 7, in particular the connecting cross piece 14b of the second comb structure 18b together with the further part structure 8 each form a planar wideband monopole.

Each of these monopoles can be contacted at a base point F, at which the distance L between the respective part structure 6, 8 and the connecting cross piece 14a, 14b that is facing the respective part structure is minimal in order to supply a signal that is to be transmitted. The signal can be supplied by virtue of contacting the first part structure 6, the second part structure 7 and the further part structure 8.

However, the arrangement of the second part structure 7 and the first part structure 6 and the further part structure 8 in two planes that extend parallel with one another also renders it possible to contact and supply the two monopoles by way of microstrip wires.

Figure 3:
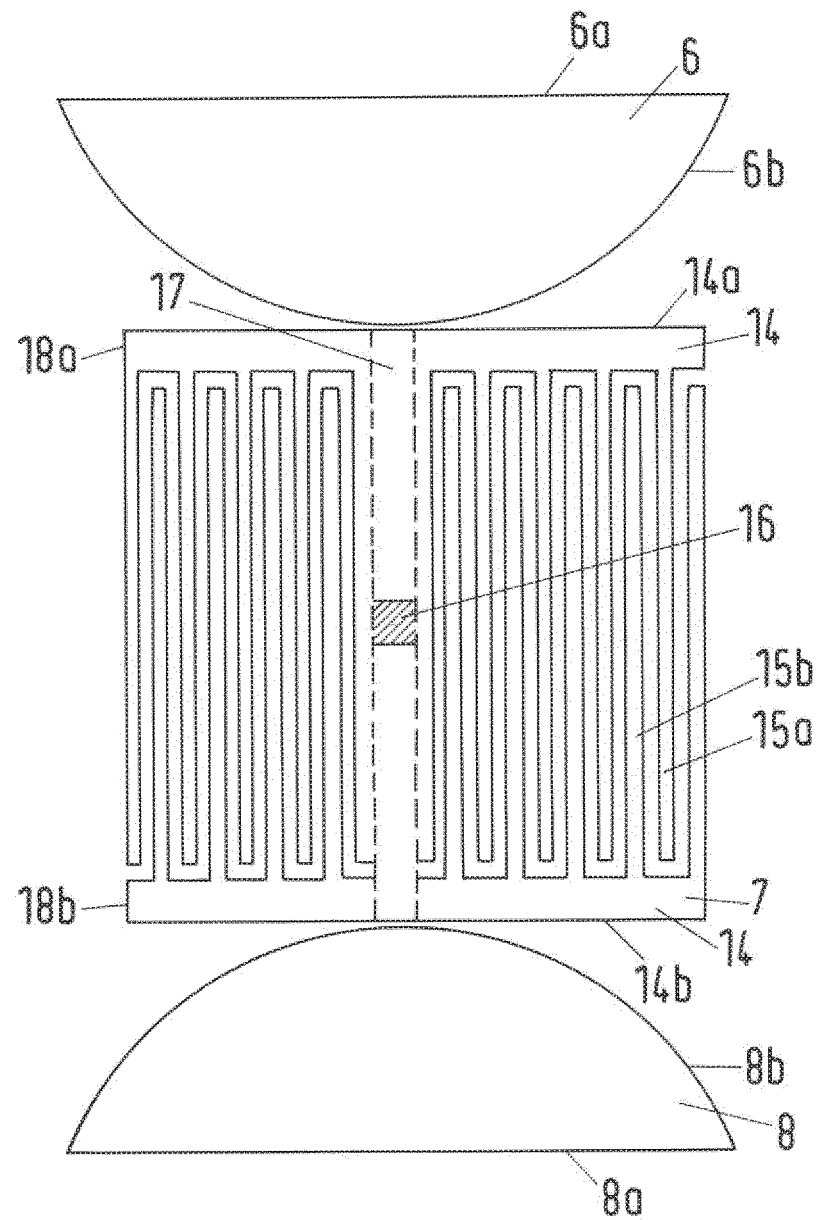
FIG. 3 a further plan view of the device illustrated in FIG. 1.

FIG. 3 illustrates a further plan view of the device 1 illustrated in FIG. 1. The connecting cross pieces 14a, 14b of the second part structure 7 form closed ground surfaces 14 of the antenna structure. FIG. 3 illustrates in contrast to FIG. 2 a feed-in point 16 by way of which a signal that is to be transmitted is supplied into the antenna structure. The figure illustrates that the feed-in point 16 is arranged centrally between the first part structure 6 and the further part structure 8. The broken line indicates a conductor track 17 that connects in an electrical manner the feed-in point 16 both to the first part structure 6 and also to the further part structure 8. The conductor track 16 can extend by way of example within the circuit board 11 illustrated in FIG. 1.

If the two connecting cross pieces 14a, 14b can be connected in an electrical manner by way of a further connecting cross piece that is not illustrated and extends parallel with the teeth 15a, 15b, this connecting cross piece can thus form a ground surface for the conductor track 17, wherein the connecting cross piece and the conductor track 17 are embodied and arranged in such a manner that a desired wave impedance is produced for the feed-in, for example 30 Ohm or 50 Ohm.

Figure 4:
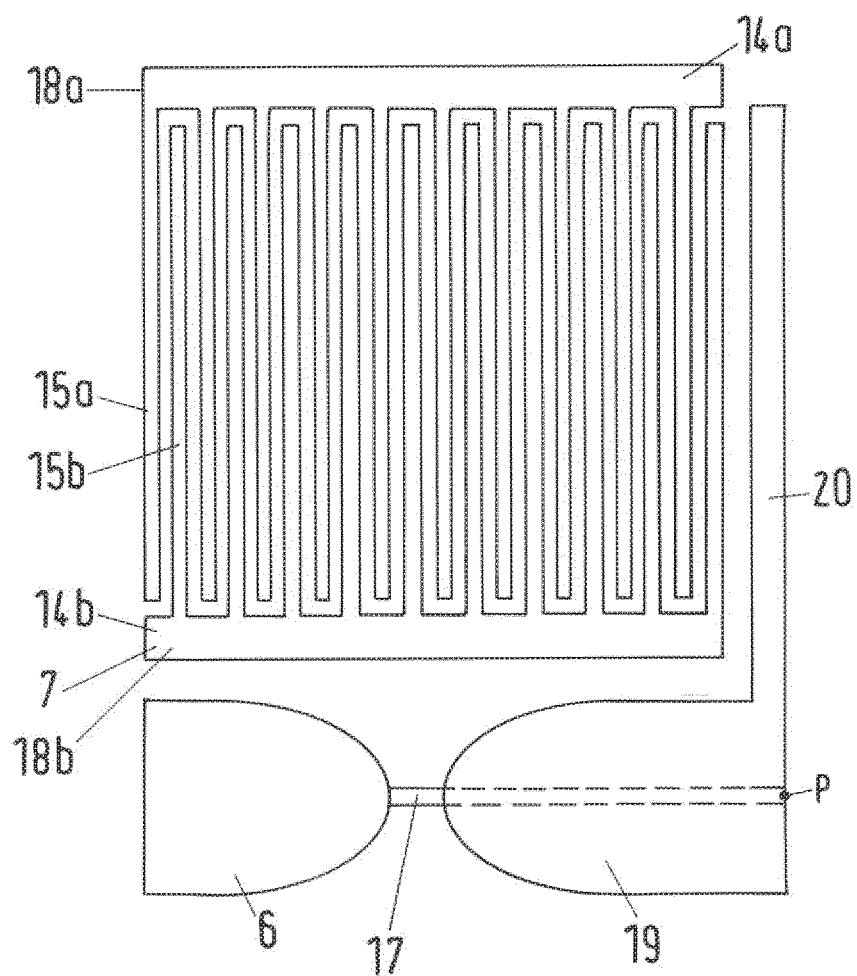
FIG. 4 a plan view of a device in accordance with the invention in a further embodiment, FIG. 5 a plan view of a device in accordance with the invention in a further embodiment, FIG. 6 a plan view of a device in accordance with the invention in a further embodiment, FIG. 7 a plan view of a device in accordance with the invention in a further embodiment and FIG. 8 a plan view of a device in accordance with the invention in a further embodiment.

FIG. 4 illustrates a plan view of a device 1 in accordance with the invention in a further embodiment. The plane of the drawing is oriented in a orthogonal manner with respect to the central axes 5a, 5b of the winding structures 3a, 3b illustrated in FIG. 1. The device 1 comprises, as illustrated in FIG. 2, a first part structure 6 and a second part structure 7, wherein the second part structure 7 forms a damping grid. The first part structure 6 comprises a cup-shaped cross section. However, in contrast to the embodiment illustrated in FIG. 2, the first part structure 6 does not taper towards the second part structure, in particular towards the connecting cross piece 14a of the first comb structure 18a, but rather tapers towards a further structure 19 that forms a ground surface for the first part structure 6. Consequently, the first part structure 6 and the further structure 19 form the antenna structure. A conductor track 17 that can be embodied for example as a microstrip wire is also illustrated. The first part structure 6 can be connected in an electrical manner to a feed-in point P. The further structure 19 and the conductor track 17 are embodied in this case in such a manner and arranged relative to one another that a desired wave impedance is provided for the feed-in.

A blind conductor structure 20 that is embodied in the form of a strip is also illustrated. This blind conductor structure is part of the further structure 19 that forms the ground surface and consequently part of the ground surface. The blind conductor structure 20 extends parallel with the teeth 15a, 15b of the comb structures 18a, 18b. The plane of the drawing in FIG. 4 forms a projection plane that is oriented perpendicular to a central axis 5a, 5b of the winding structures 3a, 3b (see FIG. 1), consequently the blind conductor structure 20 is arranged in the projection plane adjacent to the winding structures 3a, 3b.

Figure 5:
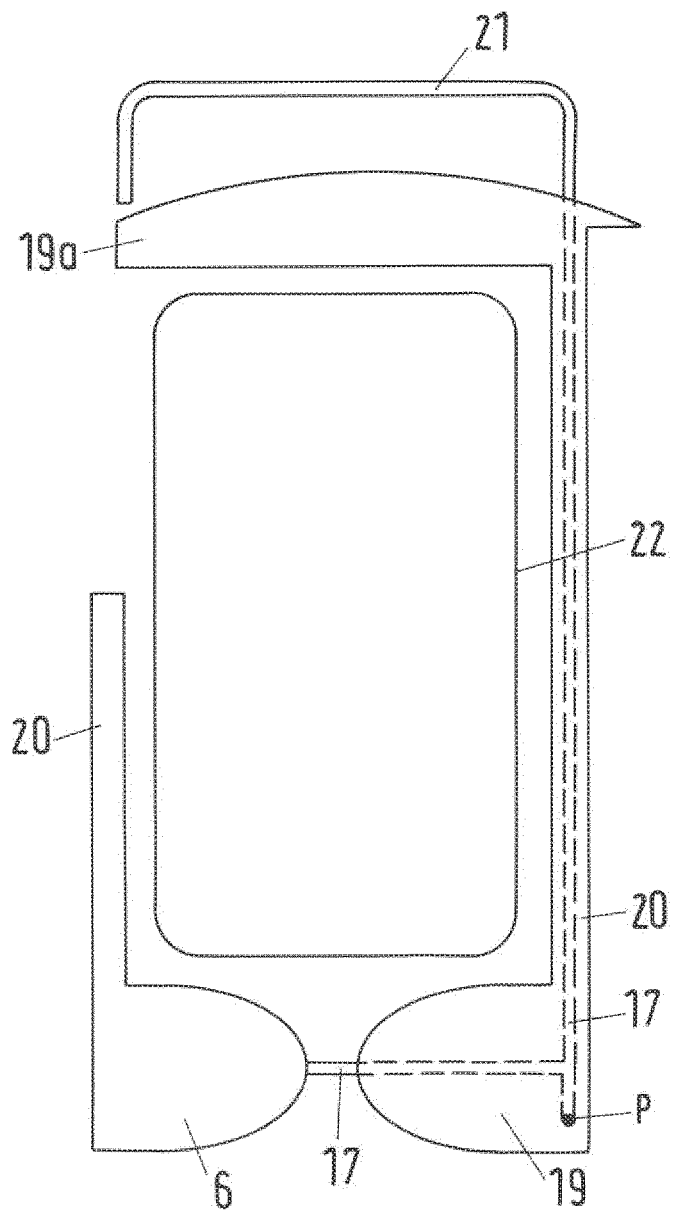

FIG. 5 illustrates a plan view of a device 1 in accordance with the invention in a further embodiment. The plane of the drawing in FIG. 5 can in turn be oriented perpendicular to a central axis 5a, 5b of a winding structure 3a, 3b (cf. FIG. 1). A sleeve 22 of the winding structures 3a, 3b is illustrated.

The device 1 comprises also a first part structure 6 of a first antenna structure and a further structure 19 that are formed according to the embodiment illustrated in FIG. 4. The further structure 19 forms in this case the ground surface of the first antenna structure.

However, in contrast to the embodiment illustrated in FIG. 4, the first part structure 6 also forms a blind conductor structure 20 that is embodied in the form of a strip and extends parallel with teeth 15a, 15b, not illustrated, of comb structures 18a, 18b (cf. for example FIG. 2).

A further difference resides in the fact that a further ground surface 19a is arranged on a free end of the blind conductor structure 20 that is formed by the further structure 19 and said further ground surface is connected in an electrical manner to the blind conductor structure 20 of the further structure 19. This further ground surface 19a tapers towards a first part structure 21 of a further antenna structure, wherein the further antenna structure is formed by the first part structure 21 and the further ground surface 19a. The first part structure 21 of the further antenna structure is embodied in this case as a conductor track that has an essentially U-shaped cross section in the projection plane, wherein the U-shaped cross section is open towards the further ground surface 19a and the ground surface tapers towards the edge section that is facing the inner volume of the U-shaped cross section.

In the projection plane, the first part structure 6 and the ground surface 19 of the first antenna structure and the first part structure 21 of the further antenna structure and also the further ground surface 19a are arranged on opposite lying sides of the sleeve 22 and also adjacent to the sleeve 22, in other words adjacent to the winding structures 3a, 3b. This arrangement ensures in an advantage manner that it is ensured that an antenna structure of an electronic terminal device that is placed for example on the placement surface illustrated in FIG. 1 is coupled in a desired signal-conducting manner to the first antenna structure and the further antenna structure as independently as possible from the position and orientation of the electronic terminal device (and consequently its antenna structure).

Figure 6:
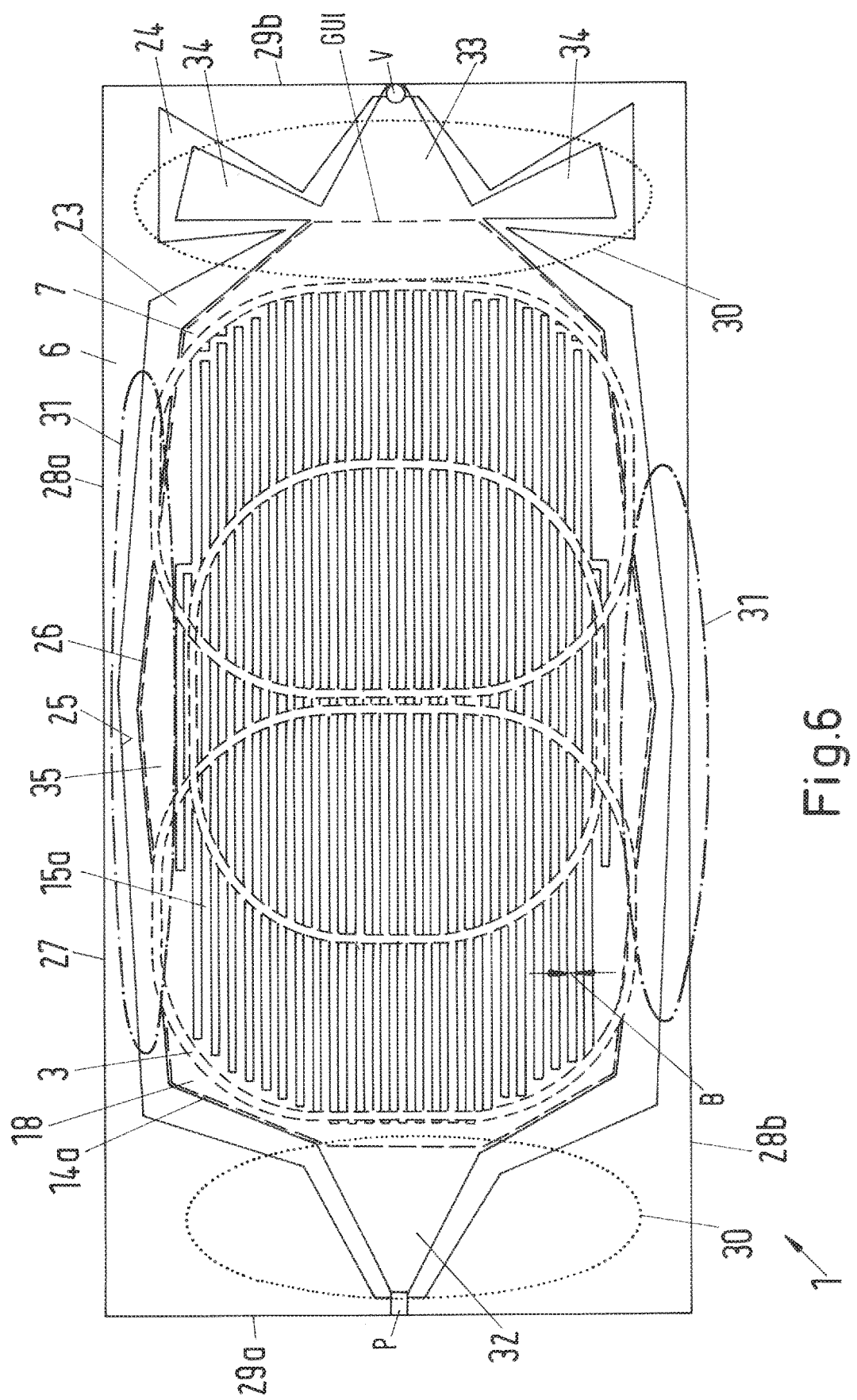

FIG. 6 is a plan view of a device 1 in accordance with the invention in a further embodiment. In this case, a first part structure 6 is embodied in the form of a frame, wherein the first part structure 6 surrounds or encompasses a second part structure 7.

FIG. 6 illustrates an inner surface 23 that is surrounded by the first part structure 6, wherein the second part structure 7 is arranged in this inner surface 23. The first part structure part structure 6 can surround this inner surface 23 in the previously mentioned projection plane, and the second part structure 7 is arranged in said inner surface. The inner surface 23, the first part structure 6 and the second part structure 7 are illustrated in a common projection plane. A gap 24 is also illustrated between an inner edge 25 of the first part structure 6 and an outer edge 26 of the second part structure 7. The figure also illustrates an outer edge 27 of the first part structure 6 that is embodied in the form of a rectangle. The outer edge 27 of the first part structure 6 comprises a first longitudinal side 28a, a further longitudinal side 28b, a first end face 29a and a further end face 29b. The longitudinal sides 28a, 28b can be longer than the end faces 29a, 29b.

The first part structure 6 is arranged on a lower face of a circuit board, not illustrated, wherein the second part structure part structure 7 is arranged on an upper face of the circuit board.

A feed-in point P is arranged in the region of the first end face 29a of the first part structure 6, wherein a signal is coupled into or decoupled from the part structures 6, 7 in the region of the feed-in point P. The first part structure 6 can be connected by way of a first contact of a high frequency plug connector (not illustrated) to a reference potential, in particular a reference potential that is constant over time, by way of example by way of a shielded cable of a coaxial cable, not illustrated. The second part structure can also be connected by way of a further contact of a high frequency plug connector (not illustrated) to a further potential that in particular changes over time, in particular by way of a cable core of the coaxial cable, not illustrated.

The first part structure 6 can form a ground surface of the antenna structure.

It is evident in FIG. 6 that a gap between the inner edge 25 of the first part structure 6 and the outer edge 26 of the second part structure 7 along the inner edge 25 of the first part structure 6 and consequently a gap width of the gap 24 varies in size.

In FIG. 6, a central axis, not illustrated, of a winding structure 3 is oriented in an orthogonal manner to the plane of the drawing and towards the observer. With regard to this central axis, a positive mathematical direction is defined as turning to the right about this central axis. The gap varies for points in the mathematical positive direction along the inner edge 25.

First coupling regions 30 are illustrated by means of ovals that have a dotted periphery. Second coupling regions 31 are illustrated by means of ovals that have a dash-dotted periphery. The gap between the inner edge 25 of the first part structure 6 and the outer edge 26 of the second part structure 7 is selected in the first coupling regions 30 in such a manner that signals can be received and transmitted in the frequency ranges of the mobile radio standards GSM850 and/or GSM900 in particular with a predetermined coupling factor. Also, the gap between the inner edge 25 of the first part structure 6 and the outer edge 26 of the second part structure 7 is selected in the second coupling regions 31 in such a manner that signals can be received and transmitted in the frequency ranges of the mobile radio standards GSM1900 and/or UMTS2100, in particular with a predetermined coupling factor.

The first coupling regions 30 are arranged in the region of the end faces 29a, 29b of the first part structure 6 and extend along the respective end faces 29a, 29b. The second coupling regions 31 are arranged in the region of the longitudinal sides 28a, 28b of the first part structure 6 and extend along the respective longitudinal sides 28a, 28b.

The figure also illustrates that the first part structure 6 and the second part structure 7 comprise in the region of the further end face 29b a connection point or connection section V so as to connect the part structures 6, 7 in a galvanic manner. This connection point or connection section V can be provided by means of a through contact arrangement or an edge region contact arrangement.

The figure also illustrates that the second part structure 6 comprises a first protrusion 32 and a further protrusion 33, wherein the further protrusion 33 comprises two sub-protrusions 34.

The figure illustrates a base perimeter line GUL of the second part structure 7 that comprises the shape of a simple convex polygon or forms a simple convex polygon. As a result of the first protrusion 32 and the further protrusion 33, the actual perimeter line of the second part structure 7 comprises the shape of a non-convex polygon. This also applies for the sub-protrusions 34 of the further protrusion 33. A base perimeter line, not illustrated of this further protrusion comprises the shape of a simple convex polygon. As a result of the sub-protrusions 34, the actual perimeter line of the further protrusion 33 comprises the shape of a non-convex polygon.

The figure illustrates that the first part structure 6 comprises recesses or indentations that correspond to the protrusions and in which the protrusions 32, 33 and sub-protrusions 34 extend.

The second part structure 7 comprises a frame-shaped edge section 35, wherein the edge section 35 encompasses a damping grid that is formed by the second part structure 7. The edge section 35 comprises in this case part sections that face the end faces 29a, 29b and part sections that face the longitudinal sides 28a, 28b, wherein the part sections are connected in a galvanic manner.

The part section that is facing the first end face 29a forms in this case a connecting cross piece 14a, wherein the teeth 15a extend from the connecting cross piece 14 towards the part section of the edge section 35 that is facing the further end face 29b. However, the free ends of the teeth 15a do not contact this part section. For the sake of clarity, only one tooth 15a is provided with a reference numeral. Consequently, the second part structure 7 comprises a comb structure 18a having teeth 15a, wherein in the embodiment illustrated in FIG. 7, the teeth 15a extend parallel with the longitudinal side 28a, 28b of the first part structure 6.

As previously explained, a width B of the slots between adjacent teeth 15a can be selected in dependence upon the frequency of the electromagnetic field that is generated by the winding structure 3.

Figure 7:
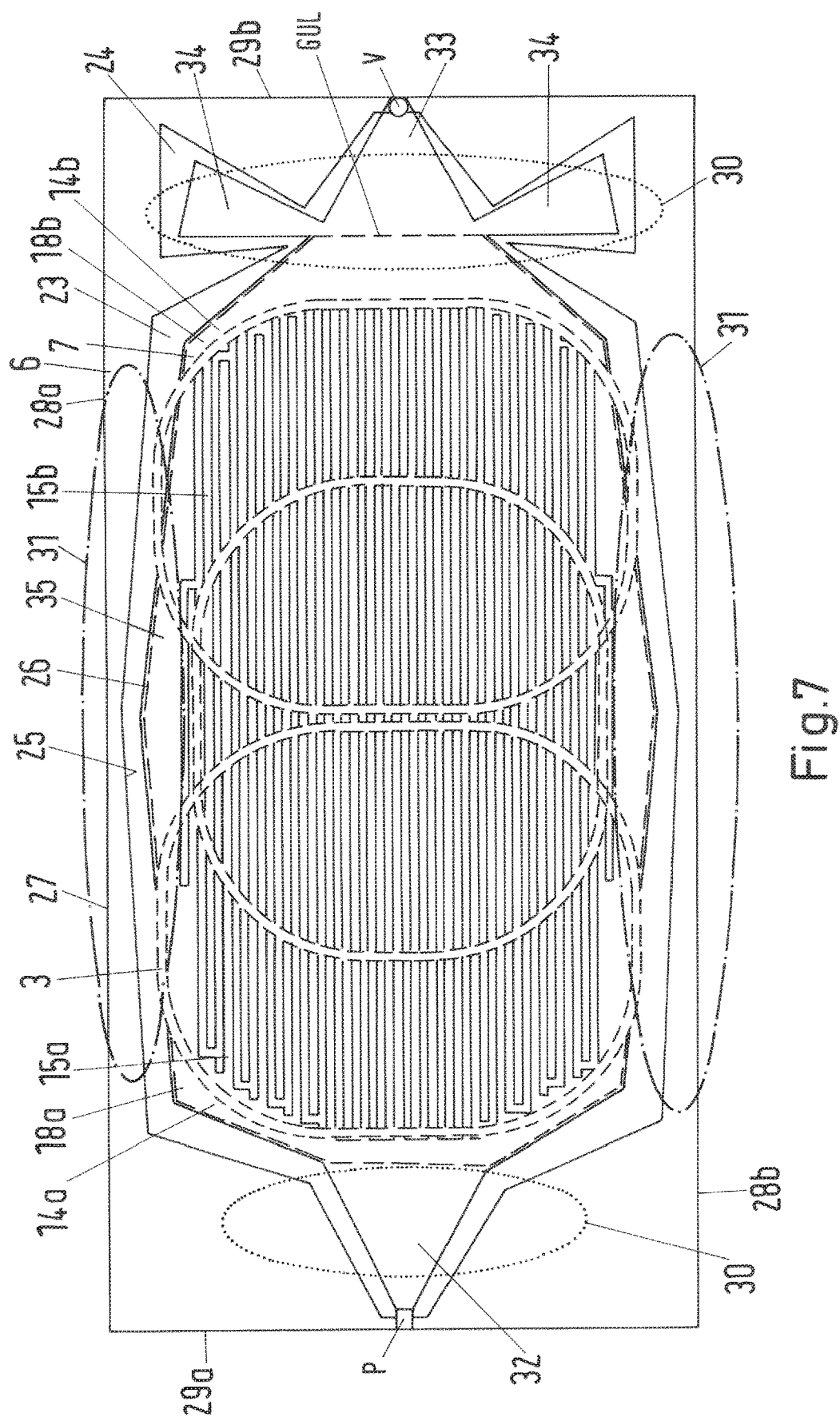

FIG. 7 illustrates a plan view of a device 1 in accordance with the invention in a further embodiment. The device illustrated in FIG. 7 is embodied essentially as the device 1 of the embodiment illustrated in FIG. 6. Reference is therefore made to the explanation relating to FIG. 6.

In contrast to the embodiment illustrated in FIG. 6, the part section of the edge section 35 of the second part structure 7 that is facing the further end face 29b also forms a second connecting cross piece 14b, wherein further teeth 15b extend from the second connecting cross piece 14b towards the part section of the edge section 35 that is facing the first end face 29a. However, the free ends of the further teeth 15b do not contact this part section. Consequently, the second part structure 7 comprises a first comb structure 18a having a first connecting cross piece 14a and first teeth 15a and also comprises a second comb structure 18b having a second connecting cross piece 14b and further teeth 15b. As already described with regard to FIG. 2, the first comb structure 18a and the second comb structure 18b are arranged with respect to one another in such a manner that the teeth 15a, 15b mesh with one another. For the sake of clarity, only one of the teeth 15a, 15b are provided with a reference numeral.

Figure 8:
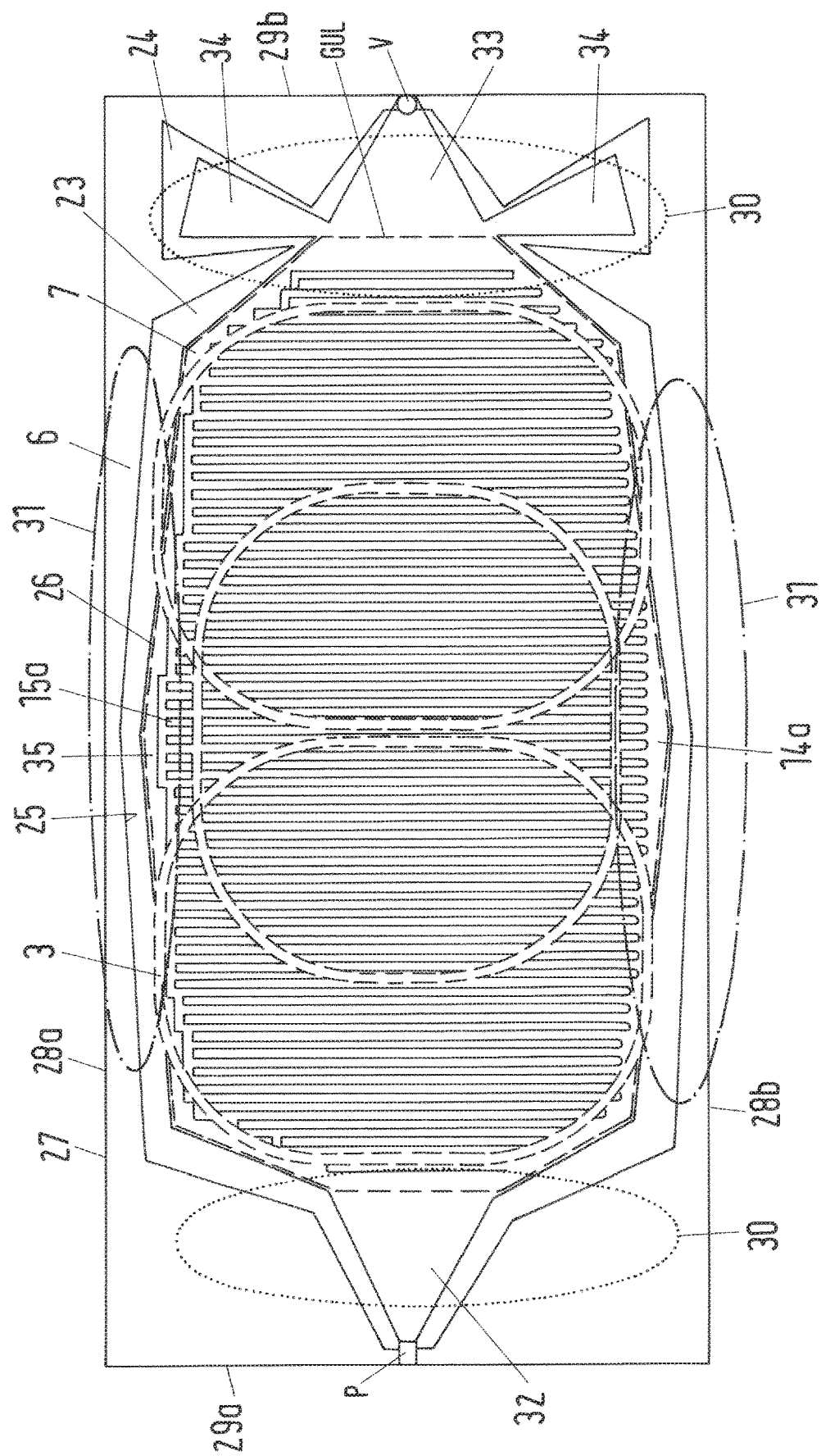

FIG. 8 illustrates a plan view of the device 1 in accordance with the invention in a further embodiment. The device illustrated in FIG. 8 is essentially embodied as the device 1 of the embodiment illustrated in FIG. 6. Reference is therefore made to the explanations relating to FIG. 6. In contrast to the embodiment illustrated in FIG. 6, the part section of the edge section 35 of the second part structure 7 that is facing a further longitudinal side 28b forms a first connecting cross piece 14a, wherein the teeth 15a extend from the connecting cross piece 14a towards the part section of the edge section 35 that is facing the first longitudinal side 28a. However, the free ends of the teeth 15a do not contact this part section. For the sake of clarity, only one tooth 15a is provided with a reference numeral.

The invention claimed is:

1. A device for combined signal transmission or for combined signal and energy transmission, the device comprising:
   at least one winding structure for generating a first electromagnetic field for transmitting energy or for transmitting signals to a wireless communication device, said at least one winding structure having a central axis being a symmetrical axis of said winding structure;
   at least one antenna structure for transmitting further signals, said antenna structure having a first part structure and a second part structure, said first part structure being disposed opposite said second part structure such that signals can be received and transmitted in a first frequency range by way of said at least one antenna structure, said first part structure and said second part structure being galvanically separate from one another, said first part structure including a tapering part and said second part structure including a tapering part, said tapering part of said first part structure and said tapering part of said second part structure tapering towards one another;
   wherein at least one selected part structure selected from the group consisting of said first part structure and said second part structure of said antenna structure comprises a blind conductor structure that extends perpendicular to an axis that connects said first part structure and said second part structure, and wherein said blind conductor structure is formed on a face of said selected part structure that lies opposite a tapering face of said selected part structure;
   wherein said first part structure is arranged adjacent said at least one winding structure in a projection plane that is oriented perpendicular to said central axis of said at least one winding structure; and
   a damping structure for damping the first electromagnetic field, said damping structure overlapping at least in part said at least one winding structure in the projection plane.

2. The device according to claim 1, wherein said damping structure and said antenna structure are arranged on a common circuit board.

3. The device according to claim 1, wherein said damping structure forms at least in part said second part structure of said antenna structure.

4. The device according to claim 1, wherein said second part structure or said first part structure forms a ground surface of said antenna structure.

5. The device according to claim 1, wherein said damping structure forms at least in part said second part structure of said antenna structure and wherein said second part structure or said first part structure forms a ground surface of said antenna structure.

6. The device according to claim 1, wherein said first part structure is a frame disposed to completely surround said second part structure.

7. The device according to claim 6, wherein a gap between an inner edge of said first part structure and an outer edge of said second part structure varies along an inner edge of said first part structure.

8. The device according to claim 6, wherein:
   an outer edge of said first part structure has a substantially rectangular contour;
   a gap formed between an inner edge of said first part structure and an outer edge of said second part structure, in a part region that extends along a longitudinal side of said first part structure, is selected such that signals may be received and transmitted in a first part frequency range;
   the gap formed between the inner edge of said first part structure and the outer edge of said second part structure, in a part region that extends along an end face of said first part structure, is selected such that signals may be received and transmitted in a further part frequency range.

9. The device according to claim 6, wherein said first part structure is formed with at least one protrusion along an inner edge thereof and/or said second part structure is formed with at least one protrusion along an outer edge thereof.

10. The device according to claim 1, wherein said damping structure forms at least in part said second part structure of said antenna structure.

11. The device according to claim 1, wherein said second part structure or said first part structure forms a ground surface of said antenna structure.

12. The device according to claim 1, wherein:
   said damping structure forms at least in part said second part structure of said antenna structure; and
   said second part structure or said first part structure forms a ground surface of said antenna structure.

13. The device according to claim 1, wherein said first part structure of said antenna structure is cup-shaped.

14. The device according to claim 1, wherein said damping structure is, at least in part, a comb-shaped structure.

15. The device according to claim 1, wherein said second part structure or said first part structure forms a ground surface of said antenna structure and wherein said damping structure is, at least in part, a comb-shaped structure.

16. The device according to claim 1, wherein said damping structure comprises at least two part sections and at least one capacitive element electrically connecting said at least two part sections.

17. The device according to claim 1, wherein said antenna structure comprises at least one further part structure opposite said second part structure disposed so as to enable signals to be received and transmitted in a second frequency range by way of said further part structure, wherein said further part structure is disposed adjacent said at least one winding structure in the projection plane.

18. A method for combined signal transmission or for combined signal and energy transmission, the method comprising:
   generating with at least one winding structure an electromagnetic field for transferring energy or for transmitting signals to a wireless communication device, the winding structure having a central axis being a symmetrical axis of the winding structure;
   receiving or transmitting signals via an antenna structure, the antenna structure having a first part structure and a second part structure, wherein the first part structure is disposed opposite the second part structure in such a manner that signals can be received and transmitted in a first frequency range by way of the antenna structure, wherein the first part structure and the second part structure are galvanically separate from one another, the first part structure includes a tapering part and the second part structure includes a tapering part, the tapering part of the first part structure and the tapering part of the second part structure taper towards one another;

wherein at least one selected part structure selected from the group consisting of the first part structure and the second part structure of the antenna structure comprises a blind conductor structure that extends perpendicular to an axis that connects the first part structure and the second part structure, and wherein the blind conductor structure is formed on a face of the selected part structure that lies opposite a tapering face of the selected part structure;

wherein at least the first part structure is arranged adjacent the at least one winding structure in a projection plane that is oriented perpendicular to the central axis of the winding structure; and damping the first electromagnetic field with a damping structure that overlaps at least in part the at least one winding structure in the projection plane.

\* \* \* \* \*